United States Patent
Chen et al.

(10) Patent No.: US 10,114,713 B1
(45) Date of Patent: *Oct. 30, 2018

(54) SYSTEMS AND METHODS FOR PREVENTING SPLIT-BRAIN SCENARIOS IN HIGH-AVAILABILITY CLUSTERS

(71) Applicant: Juniper Networks, Inc., Sunnyvale, CA (US)

(72) Inventors: Jian Chen, Fremont, CA (US); Jianhua Gu, Pleasanton, CA (US); Anthony Shun Leung Ng, San Jose, CA (US); Kuen-Der Christopher Lin, San Jose, CA (US); Xiaochen Tang, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/244,092

(22) Filed: Aug. 23, 2016

Related U.S. Application Data

(63) Continuation of application No. 14/146,804, filed on Jan. 3, 2014, now Pat. No. 9,450,852.

(51) Int. Cl.
*G06F 11/20* (2006.01)
*H04L 12/26* (2006.01)
*H04L 29/08* (2006.01)

(52) U.S. Cl.
CPC .......... *G06F 11/2033* (2013.01); *H04L 43/10* (2013.01); *H04L 67/10* (2013.01)

(58) Field of Classification Search
USPC .................................................. 714/4.1, 4.5
See application file for complete search history.

(56) References Cited

U.S. PATENT DOCUMENTS

| | | | | |
|---|---|---|---|---|
| 5,884,018 A | * | 3/1999 | Jardine | G06F 11/0724 714/4.5 |
| 5,892,895 A | * | 4/1999 | Basavaiah | G06F 11/1425 714/10 |

(Continued)

OTHER PUBLICATIONS

IBM Corporation; Advanced node failure detection; http://pic.dhe.ibm.com/infocenter/iseries/v7r1m0/index.jsp?topic=%2Frzaue%2Frzaueconceptnodefailuredetection.htm, as accessed Sep. 5, 2013, (1993, 2013).

(Continued)

*Primary Examiner* — Kamini B Patel
(74) *Attorney, Agent, or Firm* — FisherBroyles, LLP

(57) ABSTRACT

A computer-implemented method for preventing split-brain scenarios in high-availability clusters may include (1) detecting, at a first node of a high-availability cluster, a partitioning event that isolates the first node from a second node of the high-availability cluster, (2) broadcasting, from a health-status server and after the partitioning event has occurred, a cluster-health message to the first node that includes at least a health status of the second node that is based on whether the health-status server received a node-health message from the second node, and (3) reacting, at the first node and based at least in part on whether the first node received the cluster-health message, to the partitioning event such that the partitioning event does not result in a split-brain scenario within the high-availability cluster. Various other methods, systems, and computer-readable media are also disclosed.

20 Claims, 12 Drawing Sheets

(56) References Cited

U.S. PATENT DOCUMENTS

| | | | | |
|---|---|---|---|---|
| 6,363,495 B1* | 3/2002 | MacKenzie | ......... | G06F 11/1482 714/37 |
| 7,464,378 B1* | 12/2008 | Limaye | ................ | G06F 9/5061 714/100 |
| 7,590,737 B1* | 9/2009 | Chen | ..................... | G06F 11/004 709/223 |
| 7,739,541 B1* | 6/2010 | Rao | ..................... | G06F 11/0709 709/205 |
| 7,739,677 B1* | 6/2010 | Kekre | .................. | G06F 11/202 709/214 |
| 8,145,938 B2* | 3/2012 | Gupta | ................ | H04L 12/4625 714/4.2 |
| 9,146,790 B1* | 9/2015 | Dash | ....................... | G06F 11/00 |
| 9,450,852 B1* | 9/2016 | Chen | .................. | H04L 43/0817 |
| 2005/0268153 A1* | 12/2005 | Armstrong | .......... | G06F 11/0709 714/4.1 |
| 2016/0378622 A1* | 12/2016 | Ren | ...................... | G06F 11/203 714/4.11 |

OTHER PUBLICATIONS

Jian Chen, et al; Systems and Methods for Preventing Split-Brain Scenarios in High-Availability Clusters; U.S. Appl. No. 14/146,804, filed Jan. 3, 2014.

* cited by examiner

SYSTEMS AND METHODS FOR PREVENTING SPLIT-BRAIN SCENARIOS IN HIGH-AVAILABILITY CLUSTERS

CROSS REFERENCE TO RELATED APPLICATION

This application is a continuation of U.S. application Ser. No. 14/146,804, filed 3 Jan. 2014, the disclosure of which is incorporated, by this reference, in its entirety.

BACKGROUND

Certain computing systems, such as network gateways, routers, and switches, are intended to provide services continually without interruption. Such computing systems are often configured as high-availability clusters that include two or more nodes that are collectively capable of providing high availability of services. For example in a typical configuration, a high-availability cluster may include one or more active nodes that actively perform computing tasks associated with the services provided by the high-availability cluster and one or more standby nodes to which computing tasks may failover in the event of an active-node failure.

In general, if a standby node detects that an active node has failed, the standby node will begin performing the computing tasks that were assigned to the failed active node. In a typical high-availability cluster, the detection of node failures is made possible by a heartbeat mechanism in which the nodes of the high-availability cluster periodically exchange heartbeat messages that indicate their health statuses. In this way, a standby node may detect that an active node has failed by detecting when expected heartbeat messages are not received from the active node.

Unfortunately, in some situations an active node and a standby node of a high-availability cluster may become isolated from one another by a partitioning event such that the active node and the standby node are healthy but unable to exchange heartbeat messages. These situations may lead to a scenario (commonly known as a "split-brain" scenario) in which a standby node of a high-availability cluster mistakenly determines that an active node has failed and attempts to simultaneously perform similar or identical computing tasks assigned to the active node, potentially resulting in data corruption and/or service unavailability. As such, the instant disclosure identifies and addresses a need for improved systems and methods for preventing split-brain scenarios in high-availability clusters.

SUMMARY

As will be described in greater detail below, the instant disclosure generally relates to systems and methods for preventing split-brain scenarios in high-availability clusters. In one example, a computer-implemented method for preventing split-brain scenarios in high-availability clusters may include (1) detecting, at a first node of a high-availability cluster, a partitioning event that isolates the first node from a second node of the high-availability cluster, (2) broadcasting, from a health-status server and after the partitioning event has occurred, a cluster-health message to at least the first node that includes at least a health status of the second node that is based at least in part on whether the health-status server received a node-health message from the second node, and (3) reacting, at the first node after the partitioning event has occurred, to the partitioning event such that the partitioning event does not result in a split-brain scenario within the high-availability cluster, where the reaction is based at least in part on whether the first node received the cluster-health message.

Similarly, a system incorporating the above-described method may include (1) a detecting module that detects, at a first node of a high-availability cluster, a partitioning event that isolates the first node from a second node of the high-availability cluster, (2) a broadcasting module that broadcasts, from a health-status server and after the partitioning event has occurred, a cluster-health message to at least the first node that includes at least a health status of the second node that is based at least in part on whether the health-status server received a node-health message from the second node, (3) a reacting module that reacts, at the first node and after the partitioning event has occurred, to the partitioning event such that the partitioning event does not result in a split-brain scenario within the high-availability cluster based at least in part on whether the first node received the cluster-health message, and (4) at least one physical processor that executes the detecting module, the broadcasting module, and the reacting module.

A corresponding non-transitory computer-readable medium may include one or more computer-readable instructions that may, when executed by at least one processor of a computing device, cause the computing device to (1) detect, at a first node of a high-availability cluster, a partitioning event that isolates the first node from a second node of the high-availability cluster, (2) broadcast, from a health-status server and after the partitioning event has occurred, a cluster-health message to at least the first node that includes at least a health status of the second node that is based at least in part on whether the health-status server received a node-health message from the second node, and (3) react, at the first node and based at least in part on whether the first node received the cluster-health message, to the partitioning event such that the partitioning event does not result in a split-brain scenario within the high-availability cluster.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
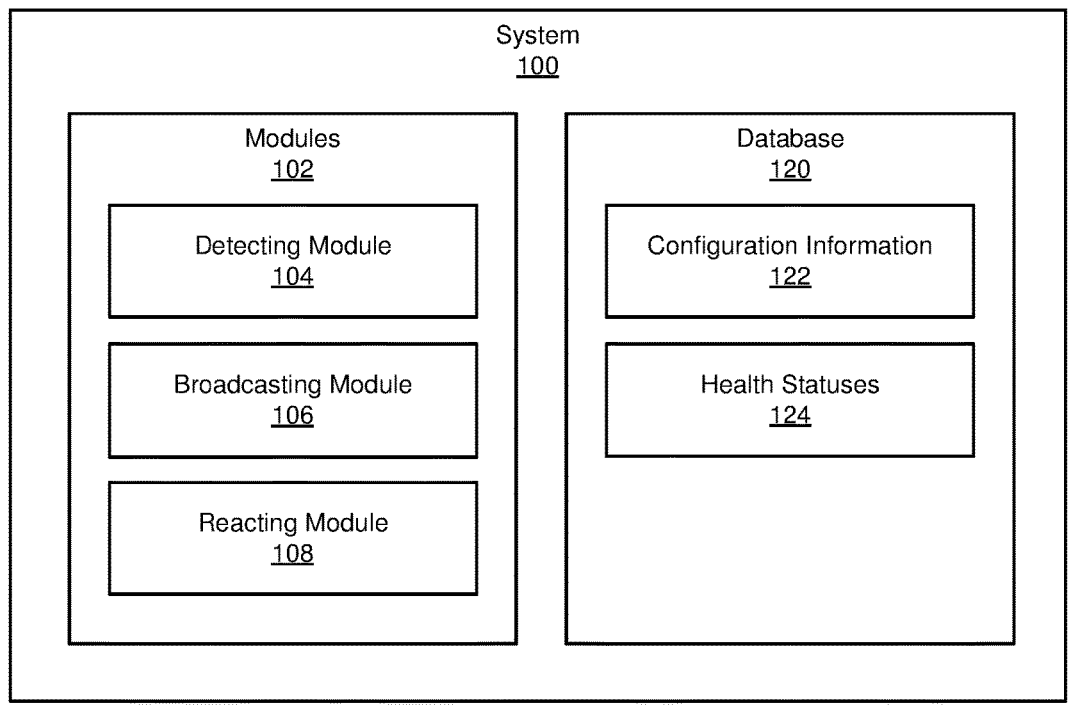
FIG. 1 is a block diagram of an exemplary system for preventing split-brain scenarios in high-availability clusters.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preventing split-brain scenarios in high-availability clusters. As will be explained in greater detail below, embodiments of the instant disclosure may prevent a partitioning event from resulting in a split-brain scenario within a high-availability cluster by enabling each node of the high-availability cluster to react to the partitioning event based on whether the node receives cluster-health messages from a health-status server associated with the high-availability cluster after the partitioning event occurs and/or based on the health statuses of the other nodes of the high-availability cluster indicated by the cluster-health messages.

For example, embodiments of the instant disclosure may prevent a partitioning event from resulting in a split-brain scenario within a high-availability cluster by causing an active node of the high-availability cluster to continue to perform computing tasks assigned to the active node only if the active node continues to receive cluster-health messages after the partitioning event occurs. In another example, embodiments of the instant disclosure may prevent a partitioning event from resulting in a split-brain scenario within a high-availability cluster by causing a standby node of the high-availability cluster to assume a computing task assigned to a failed active node only if the standby node continues to receive cluster-health messages after the partitioning event occurs and the cluster-health messages indicate that the active node has failed.

Figure 2:
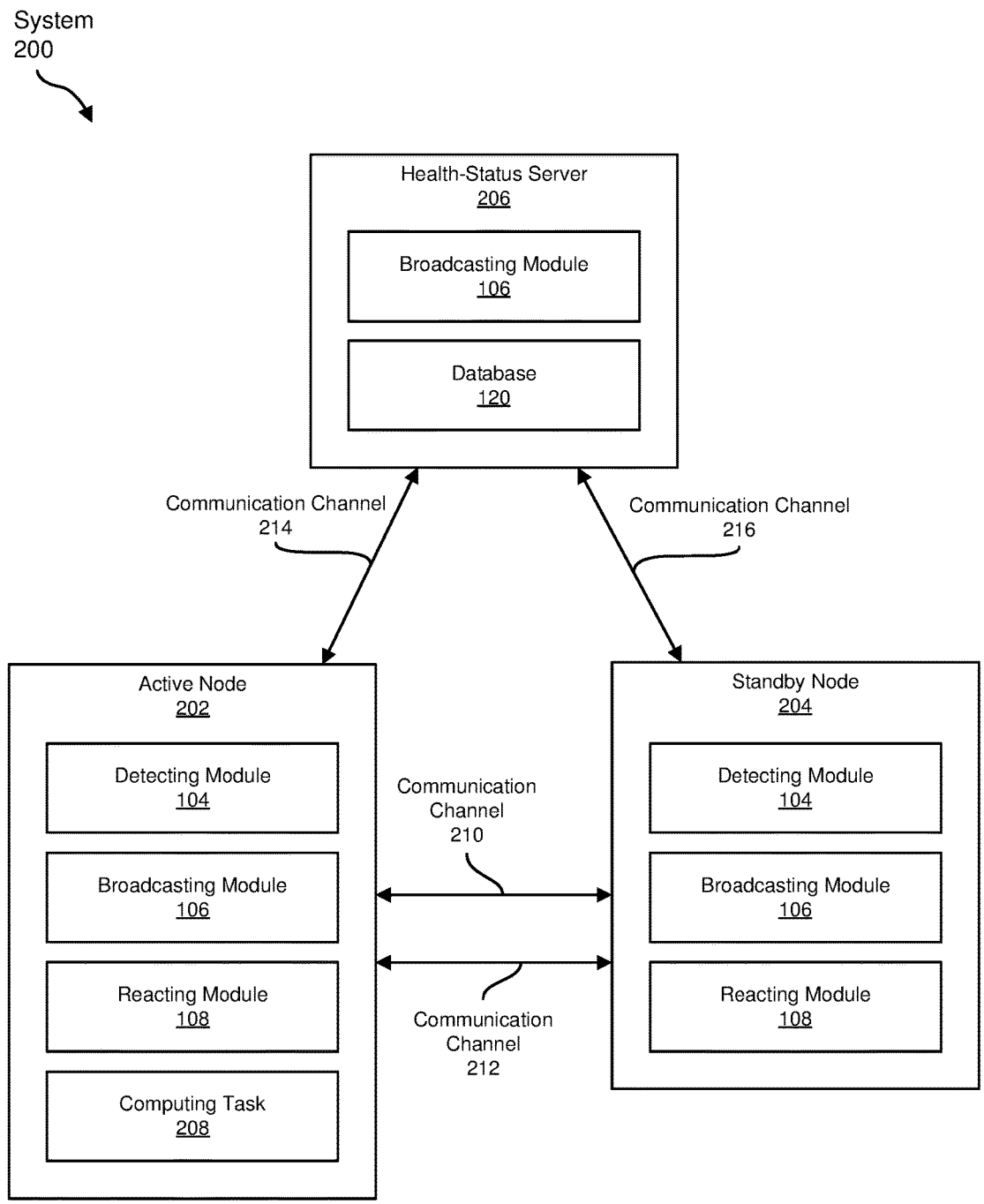
FIG. 2 is a block diagram of an exemplary system for preventing split-brain scenarios in high-availability clusters.
Figure 10:
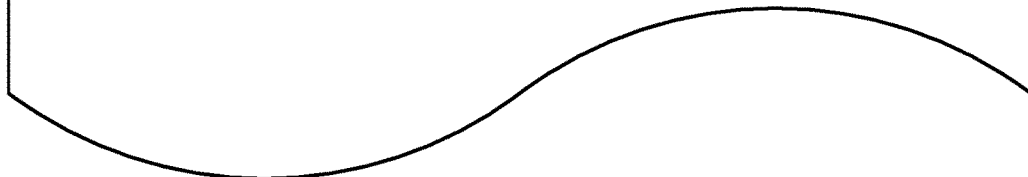
FIG. 10 is a block diagram of an exemplary cluster-health message.
Figure 11:
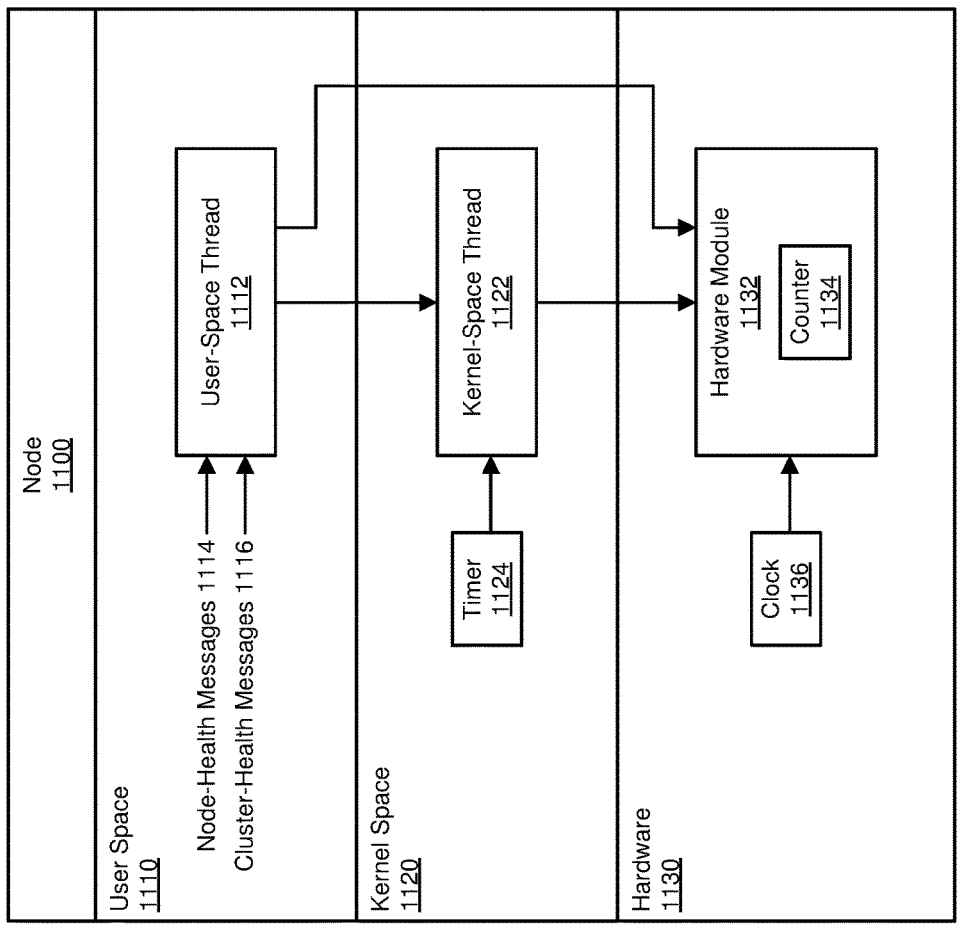
FIG. 11 is a block diagram of an exemplary system for preventing split-brain scenarios in high-availability clusters.

The following will provide, with reference to FIGS. 1, 2, and 11, detailed descriptions of exemplary systems for preventing split-brain scenarios in high-availability clusters. Detailed descriptions of corresponding computer-implemented methods will also be provided in connection with FIGS. 3-10. Finally, the discussion corresponding to FIG. 12 will provide numerous examples of systems that may include the components shown in FIGS. 1, 2, and 11.

FIG. 1 is a block diagram of an exemplary system 100 for preventing split-brain scenarios in high-availability clusters. As illustrated in this figure, exemplary system 100 may include one or more modules 102 for performing one or more tasks. For example, and as will be explained in greater detail below, exemplary system 100 may include a detecting module 104 that detects, at a first node of a high-availability cluster, a partitioning event that isolates the first node from a second node of the high-availability cluster. Exemplary system 100 may also include a broadcasting module 106 that broadcasts, from a health-status server and after the partitioning event has occurred, a cluster-health message to at least the first node that includes at least a health status of the second node that is based at least in part on whether the health-status server received a node-health message from the second node.

In addition, and as will be described in greater detail below, exemplary system 100 may include a reacting module 108 that reacts, at the first node and based at least in part on whether the first node received the cluster-health message, to the partitioning event such that the partitioning event does not result in a split-brain scenario within the high-availability cluster. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., active node 202, standby node 204, and/or health-status server 206) and/or computing system 1200 in FIG. 12. One or more of modules 102 in FIG. 1 may also represent all or portions of one or more special-purpose computers configured to perform one or more tasks. In at least one example, one or more of modules 102 in FIG. 1 may represent all or portions of a system that manages high-availability clusters.

As illustrated in FIG. 1, exemplary system 100 may also include one or more databases, such as database 120. In one example, database 120 may include configuration information 122 for storing configuration information about high-availability clusters (e.g., cluster-membership information) and health statuses 124 for storing information about the health statuses of high-availability clusters and/or nodes of high-availability clusters.

Database 120 may represent portions of a single database or computing device or a plurality of databases or computing devices. For example, database 120 may represent a portion of health-status server 206 in FIG. 2 and/or computing system 1200 in FIG. 12. Alternatively, database 120 in FIG. 1 may represent one or more physically separate devices capable of being accessed by a computing device, such as health-status server 206 in FIG. 2 and/or computing system 1200 in FIG. 12.

Exemplary system 100 in FIG. 1 may be implemented in a variety of ways. For example, all or a portion of exemplary system 100 may represent portions of exemplary system 200 in FIG. 2. As shown in FIG. 2, system 200 may include an active node 202, a standby node 204, and/or a health-status server 206 in communication via communication channels 210-216. In some examples, active node 202 and/or standby node 204 may be programmed with one or more of modules 102 and/or may store all or a portion of the data in database 120. Additionally or alternatively, health-status server 206 may be programmed with one or more of modules 102 and/or may store all or a portion of the data in database 120.

In one embodiment, one or more of modules 102 from FIG. 1 may, when executed by at least one processor of active node 202, standby node 204, and/or health-status server 206, cause active node 202, standby node 204, and/or health-status server 206 to preventing split-brain scenarios in a high-availability cluster of which active node 202 and standby node 204 are members. For example, and as will be described in greater detail below, one or more of modules 102 may cause active node 202 and/or standby node 204 to detect a partitioning event that isolates active node 202 from standby node 204 (e.g., partitioning event 400 in FIG. 4). After the partitioning event occurs, one or more of modules 102 may then cause health-status server 206 to broadcast a cluster-health message to active node 202 and/or standby node 204 that includes (1) a health status of active node 202 that is based on whether health-status server 206 received a node-health message from active node 202 after the partitioning event occurred and/or (2) a health status of standby node 204 that is based on whether health-status server 206 received a node-health message from standby node 204 after the partitioning event occurred. One or more of modules 102 may then cause active node 202 and/or standby node 204 to react to the partitioning event such that the partitioning event does not result in a split-brain scenario based at least in part on whether active node 202 and/or standby node 204 received the cluster-health message that was broadcast from health-status server 206 after the partitioning event occurred.

Active node 202 and standby node 204 generally represent any type or form of computing device capable of reading computer-executable instructions and/or any type or form of computing device capable of being configured as part of a high-availability cluster. Examples of active node 202 and standby node 204 include, without limitation, gateways, network bridges, multilayer switches, network hubs, signal repeaters, packet switches, and/or routers, laptops, tablets, desktops, servers, cellular phones, Personal Digital Assistants (PDAs), multimedia players, embedded systems, virtual machines, hypervisors, combinations of one or more of the same, exemplary computing system 1210 in FIG. 12, or any other suitable computing device.

As shown in FIG. 2, active node 202 and standby node 204 may represent all or a portion of a high-availability cluster. As used herein, the term "high-availability cluster" may refer to any group of two or more nodes (such as active node 202 and standby node 204) capable of communicating with one another to collectively perform one or more computing tasks (e.g., computing task 208), such as collectively providing high availability of at least one service or application. In one example, the term "high-availability cluster" may refer to a cluster of network devices that provide one or more network services (e.g., a JUNIPER CHASSIS CLUSTER).

A high-availability cluster may include one or more active nodes (e.g., a node that actively performs certain computing tasks associated with the services provided by the high-availability cluster) and one or more standby nodes (e.g., a node to which certain computing tasks may failover in the event of an active-node failure). In at least one example, a single node of a high-availability cluster may act as an active node for some computing tasks while simultaneously acting as a standby node for other computing tasks.

As shown in FIG. 2, active node 202 may represent an active node actively performing computing task 208, and standby node 204 may represent a standby node to which computing task 208 may failover in the event that active node 202 fails. Computing task 208 generally represents any computing task associated with providing and/or executing a service or application. For example, a computing task of a service-gateway cluster may include computing tasks that forward network traffic and/or update routing tables.

Health-status server 206 generally represents any type or form of computing device that is capable of reading computer-executable instructions. Examples of health-status server 206 include, without limitation, application servers and database servers. In some examples, health-status server 206 may represent a computing device (e.g., a proxy server) that acts as an intermediary through which the nodes of a high-availability cluster may exchange health-status information. In at least one example, health-status server 206 may represent a node of a high-availability cluster that acts as an intermediary through which other nodes of the high-availability cluster may exchange health-status information.

Communication channels 210-216 generally represent any medium or architecture capable of facilitating communication or data transfer. Examples of communication channels 210-216 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Communication channels 210-216 may facilitate communication or data transfer using wireless or wired connections.

Communication channels 210 and 212 may represent node-to-node communication channels (such as, e.g., JUNIPER'S CONTROL and FABRIC LINKS) that facilitate communication and data transfer between active node 202 and standby node 204. In at least one example, active node 202 and standby node 204 may use communication channels 210 and 212 to exchange health-status information and/or synchronize cluster state information (e.g., configuration information and/or operational-status information). Communication channels 214 and 216 may represent communication channels that facilitate communication and data transfer between active node 202, standby node 204, and health-status server 206.

Figure 3:
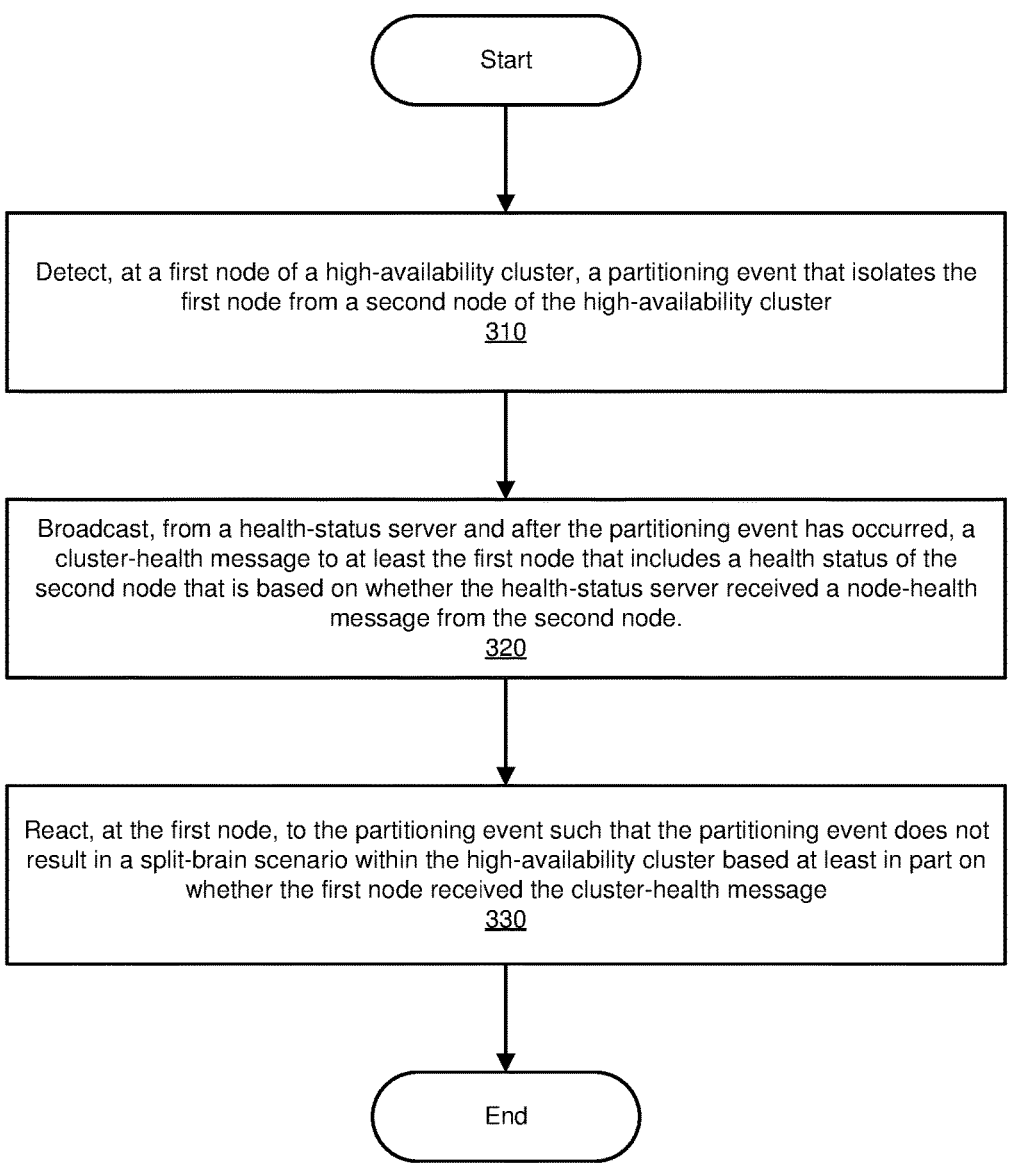
FIG. 3 is a flow diagram of an exemplary method for preventing split-brain scenarios in high-availability clusters.

FIG. 3 is a flow diagram of an exemplary computer-implemented method 300 for preventing split-brain scenarios in high-availability clusters. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 1200 in FIG. 12.

As illustrated in FIG. 3, at step 310 one or more of the systems described herein may detect, at a first node of a high-availability cluster, a partitioning event that isolates the first node from a second node of the high-availability cluster. For example, detecting module 104 may, as part of active node 202 and/or standby node 204 in FIG. 2, detect partitioning event 400 in FIG. 4, partitioning event 500 in FIG. 5, and/or partitioning event 600 in FIG. 6.

As used herein, the term "partitioning event" generally refers to any event that prevents one node of a high-availability cluster from directly communicating with another node within the high-availability cluster. In at least one example, the term "partitioning event" may refer to any event that prevents two nodes of a high-availability cluster from directly exchanging health-status information and/or synchronizing cluster state information.

Partitioning events typically occur as a result of node or communication-channel failures. For example, a partitioning event may occur when a node is unable to send or receive node-health messages (e.g., as a result of the node's central processing unit having become so overloaded that the node is unable to timely send or receive node-health messages). Additionally or alternatively, a partitioning event may occur when a node's communication interface fails, when a cable connected to a node's communication interface fails, when a cable connected to the node's communication interface is disconnected, and/or when a network switch (or a port of a network switch) connected to the node's communication interface fails.

Figure 4:
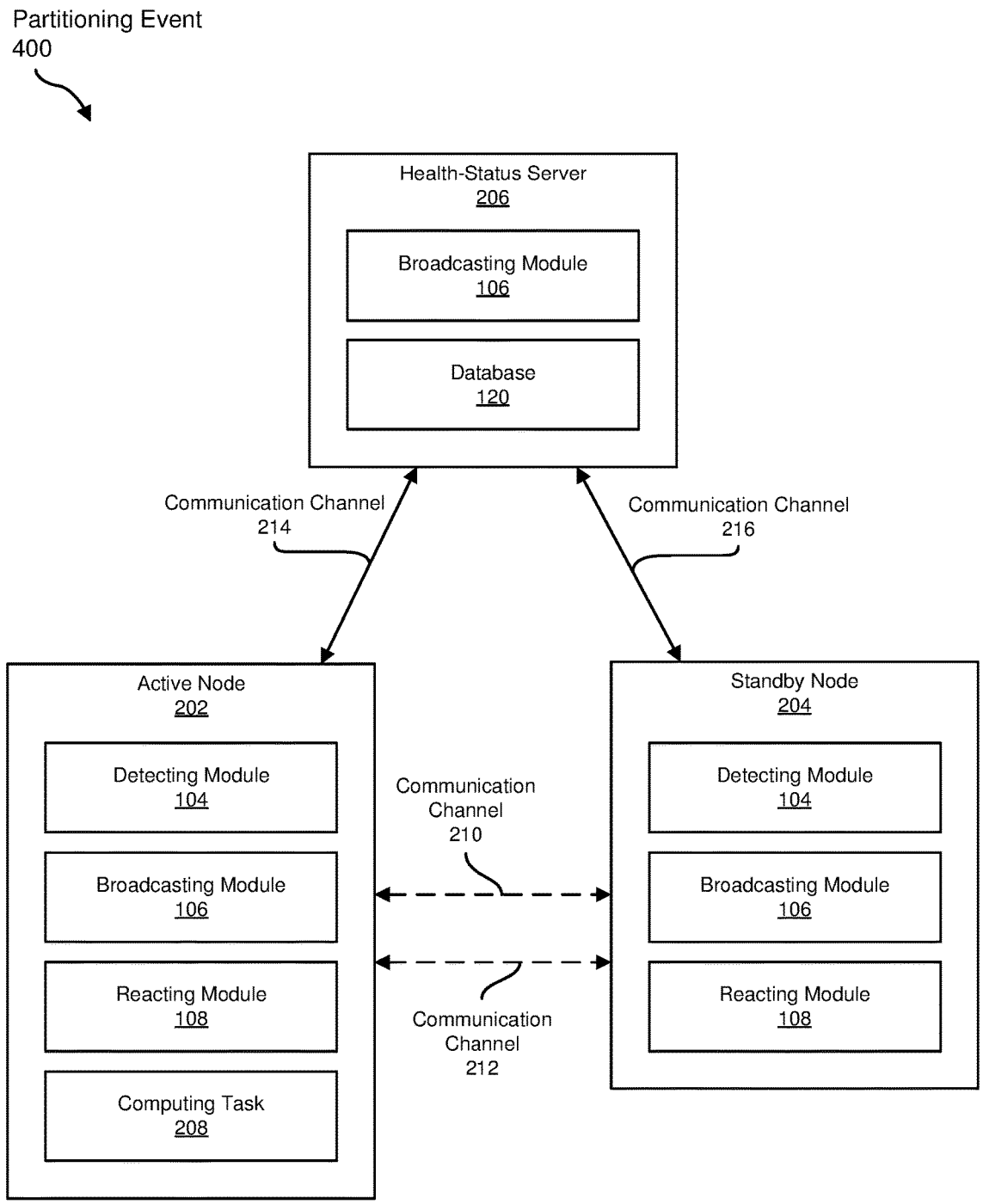
FIG. 4 is a block diagram of an exemplary partitioning event.
Figure 5:
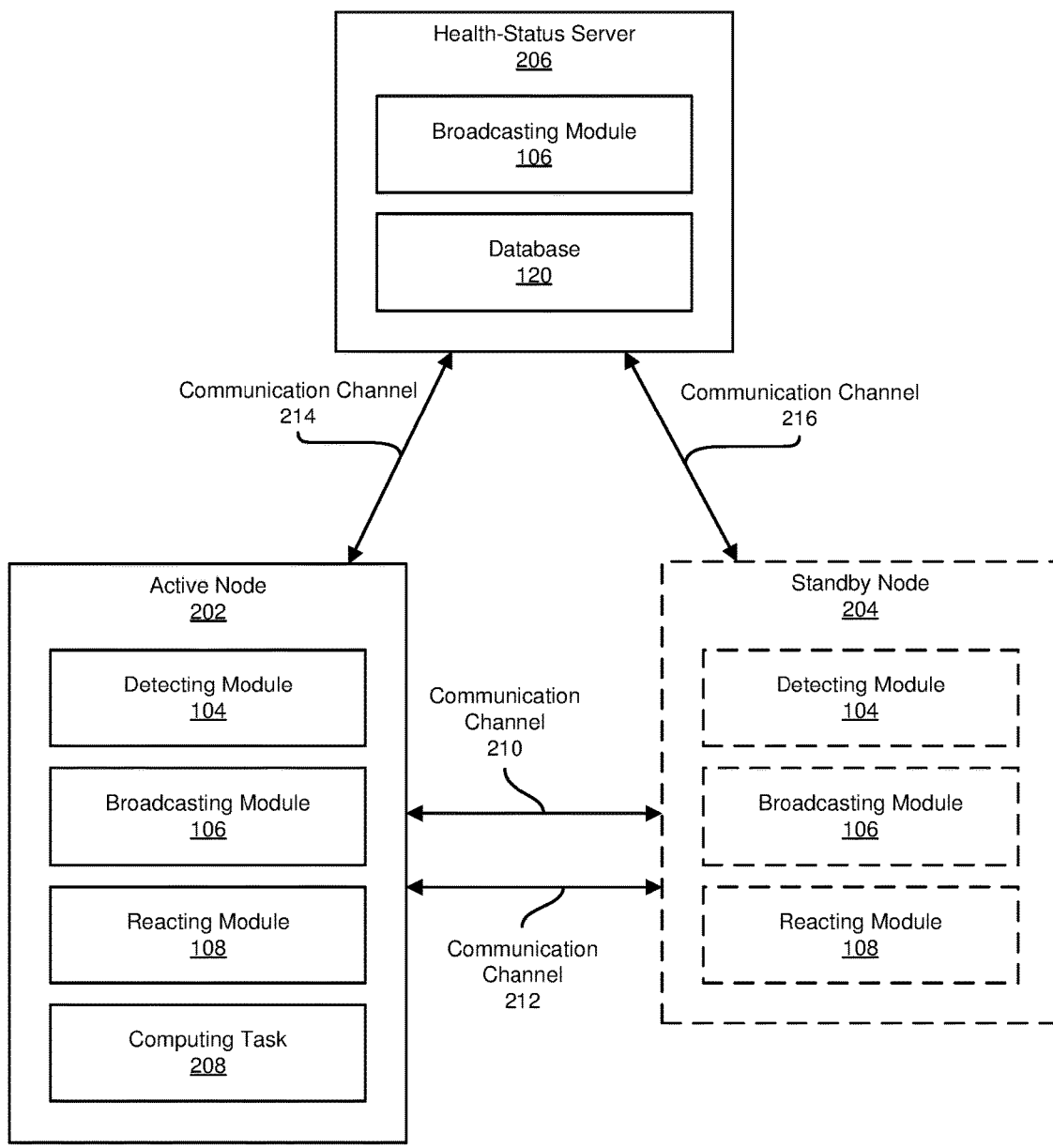
FIG. 5 is a block diagram of an exemplary partitioning event.
Figure 6:
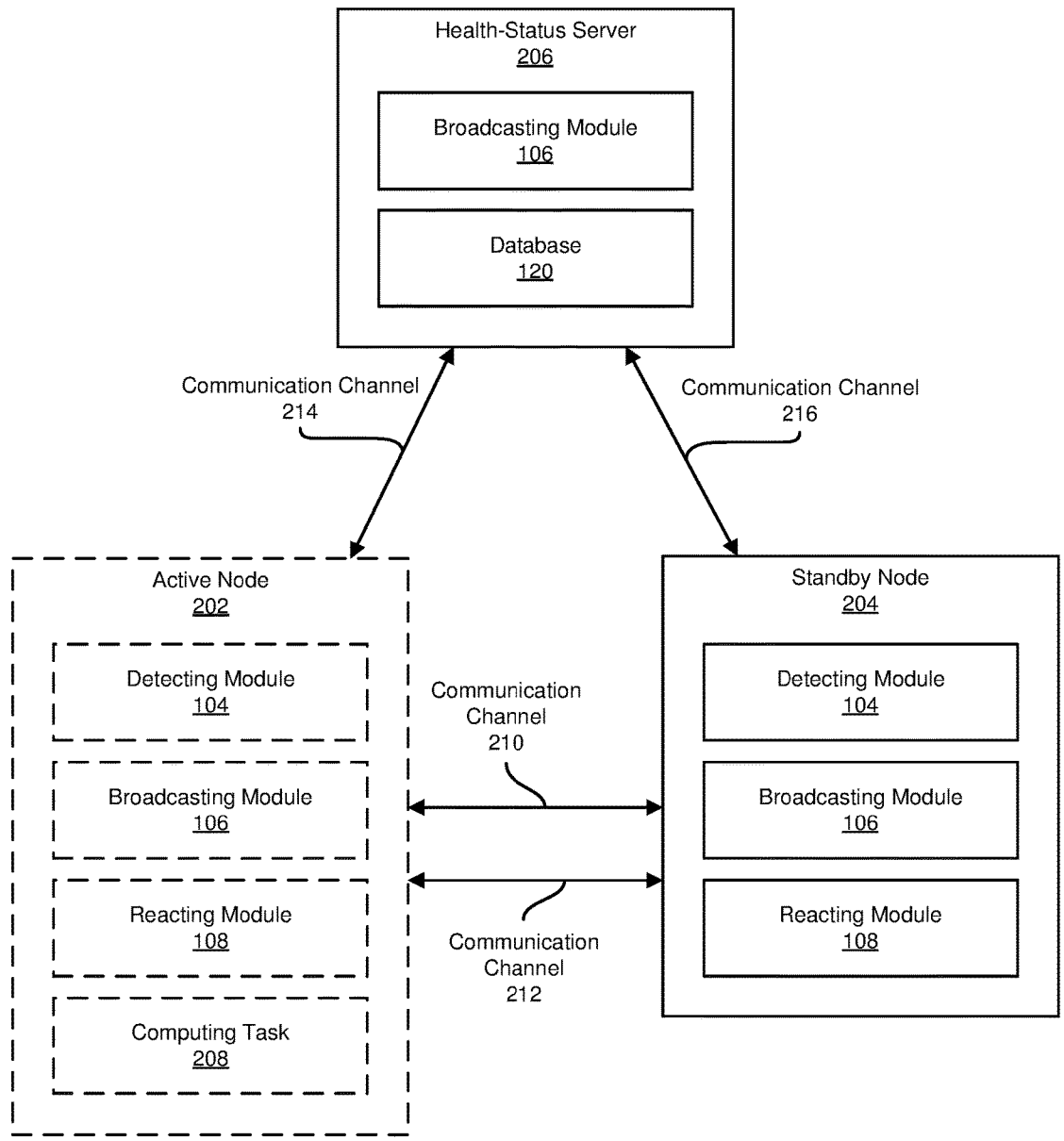
FIG. 6 is a block diagram of an exemplary partitioning event.
Figure 7:
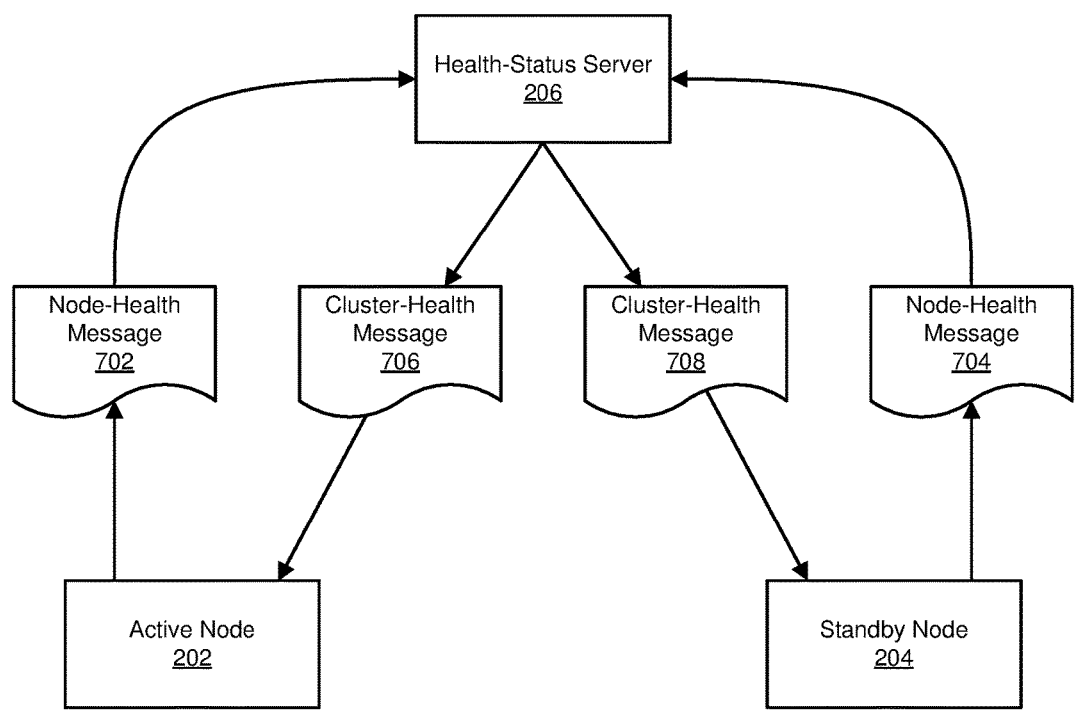
FIG. 7 is a flow diagram of an exemplary method for broadcasting cluster-health messages.

FIGS. 4-6 illustrate various exemplary partitioning events. For example, FIG. 4 illustrates an exemplary partitioning event 400 that may prevent active node 202 from directly communicating with standby node 204 as a result of a failure of communication channels 210 and 212. Exemplary partitioning events 500 in FIGS. 5 and 600 in FIG. 6, on the other hand, illustrate partitioning events caused by node failures. For example, FIG. 5 illustrates an exemplary partitioning event 500 that prevents active node 202 from communicating with standby node 204 as a result of a failure of standby node 204. Similarly, FIG. 6 illustrates an exemplary partitioning event 600 that prevents standby node 204 from communicating with active node 202 as a result of a failure of active node 202.

Returning to FIG. 3, the systems described herein may perform step 310 in any suitable manner. In general, detecting module 104 may detect a partitioning event by detecting a communication failure between two nodes within a high-availability cluster. For example, detecting module 104 may detect a partitioning event by detecting when two nodes within a high-availability cluster are unable to exchange health-status information and/or are unable to synchronize cluster state information.

In some examples, detecting module 104 may, as part of a node of a high-availability cluster, detect a partitioning event within the high-availability cluster by periodically exchanging node-health messages (e.g., heartbeat messages) directly with the node's peers and by detecting that the node failed to receive an expected node-health message. For example, detecting module 104 may, as part of active node 202, detect a partitioning event that isolates active node 202 from standby node 204 by periodically and/or continually exchanging node-health messages with standby node 204 and by detecting when active node 202 fails to receive an expected node-health message from standby node 204.

At step 320, one or more of the systems described herein may broadcast, from a health-status server and after the partitioning event has occurred, a cluster-health message to the first node that includes a health status of the second node that is based on whether the health-status server received a node-health message from the second node. For example, broadcasting module 106 may, as part of health-status server 206 in FIG. 2 and after partitioning event 400 in FIG. 4 has occurred, broadcast a cluster-health message to active node 202 and standby node 204 that includes the health statuses of active node 202 and standby node 204. In this example, the health status of active node 202 may be based on whether health-status server 206 received a node-health message from active node 202 after partitioning event 400 occurred, and the health status of standby node 204 may be based on whether health-status server 206 received a node-health message from standby node 204 after partitioning event 400 occurred.

Figure 9:
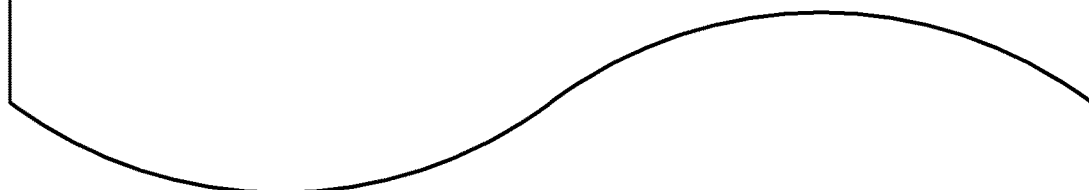
FIG. 9 is a block diagram of an exemplary cluster-health message.

As used herein, the term "cluster-health message" generally refers to any communication that is broadcast to a node of a high-availability cluster from a health-status server associated with the high-availability cluster and that includes a health status of one of the node's peers that is based on a node-health message sent from the node's peer to the health-status server. Examples of exemplary cluster-health messages are illustrated in FIGS. 9 and 10. In some examples, a cluster-health message may contain a health status for each and every node of a high-availability cluster. In other examples, a cluster-health message may contain a health status for only one node of a high-availability cluster or a subset of nodes within a high-availability cluster.

Cluster-health messages may be used to determine a node's health status and/or the health statuses of the node's peers after a partitioning event has occurred. For example, a node may be considered healthy after a partitioning event has occurred if the node is able to send node-health messages to a health-status server and/or receive cluster-health messages from a health-status server after the partitioning event occurs.

Figure 8:
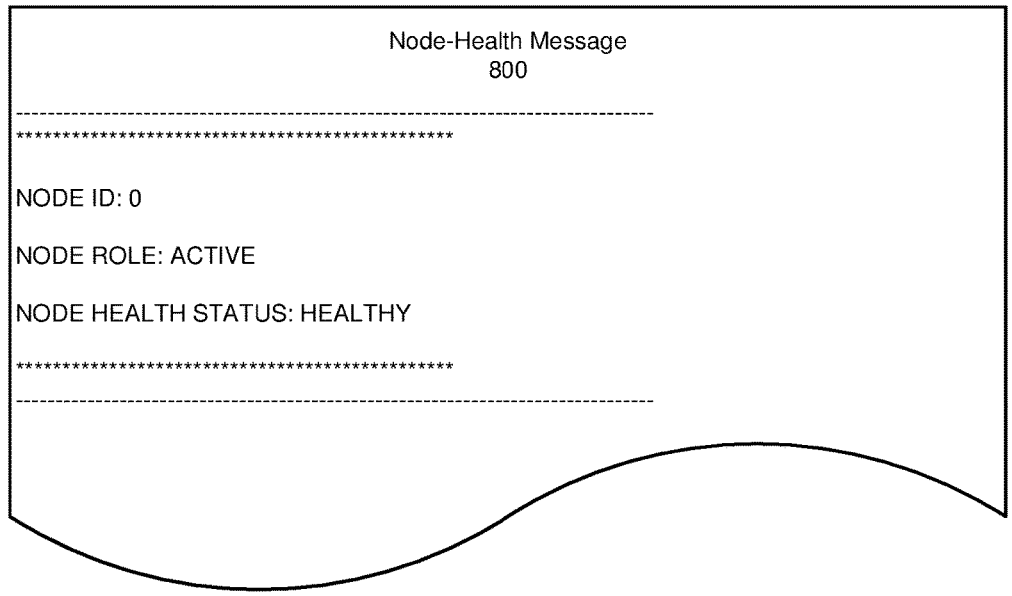
FIG. 8 is a block diagram of exemplary node-health messages.
Figure 8:
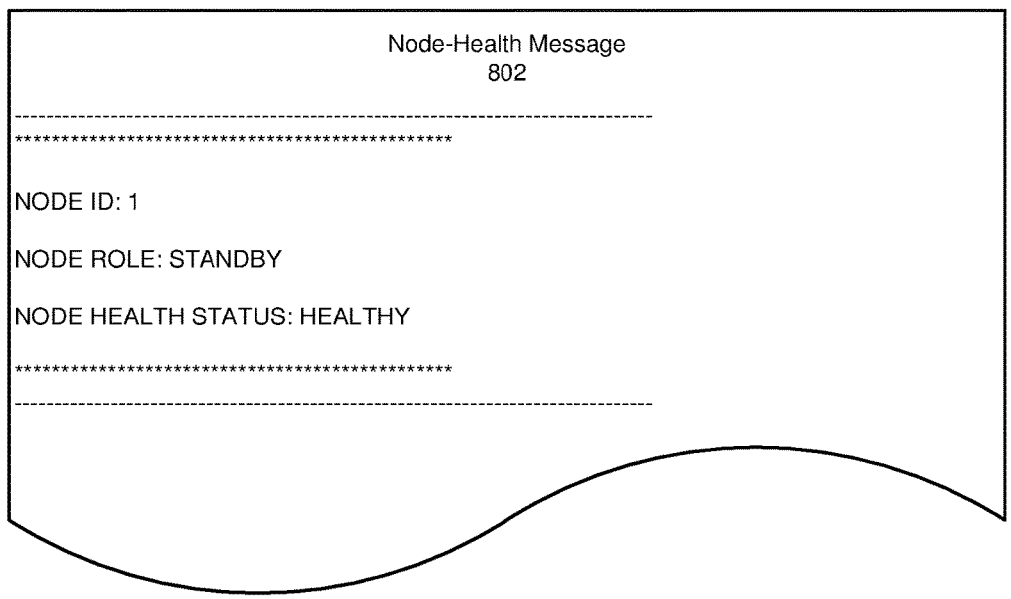

As used herein, the phrase "node-health message" generally refers to any communication (e.g., a heartbeat message) sent from a node within a high-availability cluster to a health-status server associated with the high-availability cluster that indicates the health status of the node and that can be used by the health-status server to create cluster-health messages. Examples of exemplary node-health messages are illustrated in FIG. 8. The phrase "health status," as used herein, generally refers to any indication that a node of a high-availability cluster is sufficiently healthy to perform computing tasks associated with the services performed by the high-availability cluster.

Returning to FIG. 3, the systems described herein may perform step 320 in any suitable manner. In one example, broadcasting module 106 may, as part of each node of a high-availability cluster and before and/or after any partitioning event occurs within the high-availability cluster, periodically and/or continuously send node-health messages to a health-status server. Using FIG. 7 as an example, broadcasting module 106 may, as part of active node 202, periodically send node-health messages (such as node-health message 702) to health-status server 206 that indicates the health status of active node 202 and may, as part of standby node 204, periodically send node-health messages (such as node-health message 704) to health-status server 206 that indicates the health status of standby node 204.

As node-health messages are sent by nodes within a high-availability cluster to a health-status server, broadcasting module 106 may, as part of the health-status server and before and/or after any partitioning event occurs, use the health statuses indicated by the node-health messages that it receives to periodically and/or continuously broadcast cluster-health messages (using any suitable communication method such as, e.g., unicast, multicast, or broadcast) to each node of the high-availability cluster that indicates a health status for each node of the high-availability cluster. Using FIG. 7 as an example, broadcasting module 106 may, as part of health-status server 206, use the node-health messages that it receives from active node 202 and standby node 204 (such as node-health messages 702 and 704) to periodically broadcast cluster-health messages (such as cluster-health messages 706 and 708) to active node 202 and standby node 204 that indicates a health status for each of active node 202 and standby node 204.

Using FIGS. 8 and 9 as another example, broadcasting module 106 may, as part of health-status server 206, create and then broadcast cluster-health message 900 to active node 202 and standby node 204 based on node-health message 800 received from active node 202 that indicates that active node 202 is healthy and node-health message 802 received from standby node 204 that indicates that standby node 204 is healthy.

In some examples, broadcasting module 106 may, as part of a health-status server, broadcast a cluster-health message that includes a health status that indicates that a node is unhealthy in response to receiving a node-health message from the node that indicates that the node is unhealthy. Using FIG. 10 as an example, broadcasting module 106 may, as part of health-status server 206, create and then broadcast cluster-health message 1000 to standby node 204 that indicates that active node 202 is unhealthy in response to receiving a node-health message from active node 202 that indicates that active node 202 is unhealthy.

In some examples, broadcasting module 106 may broadcast cluster-health messages to the nodes of a high-availability cluster by acting as an intermediary (e.g., a proxy server) through which the nodes of the high-availability cluster may exchange node-health messages. In one example, broadcasting module 106 may broadcast cluster-health messages to the nodes of a high-availability cluster by simply rebroadcasting the node-health messages that it receives. As such, the term "cluster-health message" may refer to node-health messages that have been rebroadcasted by a health-status server.

In general, broadcasting module 106 may, as part of a health-status server, create a cluster-health message such that the health status of each node indicated by the cluster-health message reflects the health status of the node indicated by the most recent node-health message received from the node rather than the health-status server's own determination of the health status of the node. For example, broadcasting module 106 may, as part of a health-status server, update the health status of a node only after receiving a node-health message from the node itself.

In some examples, broadcasting module 106 may, as part of a health-status server, create a cluster-health message such that the health status of each node indicated by the cluster-health message is associated with a timestamp that indicates when the health-status server received the node's most recent node-health message and/or when the health-status server last updated the health status of the node (e.g., as illustrated by cluster-health message 900 in FIG. 9). As will be explained in greater detail below, a node's peers may determine that the node is unhealthy even when the health status of the node indicated by a cluster-health message indicates that the node is healthy by determining that the timestamp associated with the health status of the node indicates that the health status of the node has not been updated during a predetermined grace period.

At step 330, one or more of the systems described herein may react, at the first node, to the partitioning event such that the partitioning event does not result in a split-brain scenario within the high-availability cluster based at least in part on whether the first node received the cluster-health message. For example, reacting module 108 may, as part of active node 202 in FIG. 2, react to partitioning event 400 in FIG. 4 such that partitioning event 400 does not result in a split-brain scenario based at least in part on whether active node 202 received a cluster-health message from health-status server 206 after partitioning event 400 occurred. Upon completion of step 330, exemplary method 300 in FIG. 3 may terminate.

As used herein, the phrase "split-brain scenario" may refer to any scenario in which a node of a high-availability cluster improperly reacts to a partitioning event within the high-availability cluster because of a lack of an understanding of the health statuses of the nodes of the high-availability cluster after the partitioning event has occurred. As such, and as will be explained in greater detail below, the systems and methods described herein may prevent split-brain scenarios in a high-availability cluster by causing each node of the high-availability cluster to react to the partitioning event within the high-availability cluster using a proper understanding of the health statuses of the other nodes of the high-availability cluster after the partitioning event.

The systems described herein may perform step 330 in any suitable manner. In general, reacting module 108 may, as part of a node of a high-availability cluster, react to a partitioning event by (1) determining up-to-date health statuses of the nodes of the high-availability cluster based on cluster-health messages received by the node after the partitioning event has occurred and (2) reacting to the partitioning event according to the up-to-date health statuses. In some examples, reacting module 108 may wait a predetermined amount of time after a partitioning event has occurred before reacting to the partitioning event.

As indicated above, the fact that a node is currently receiving cluster-health messages may indicate that the node is currently healthy. For at least this reason, reacting module 108 may, as part of a node, determine an up-to-date health status for the node based at least in part on whether the node is currently receiving cluster-health messages.

After a partitioning event has occurred and reacting module 108 has determined an up-to-date health status for a node, reacting module 108 may, as part of the node, cause the node to react to the partitioning event. For example, reacting module 108 may, as part of an active node, cause the active node to continue to perform computing tasks assigned to the active node if the active node is healthy after the partitioning event has occurred. Alternatively, reacting module 108 may, as part of an active node, cause the active node to stop performing computing tasks assigned to the active node if the active node is unhealthy after the partitioning event has occurred. Similarly, reacting module 108 may, as part of a standby node, cause the standby node to exit the high-availability cluster to which it belongs if the standby node is unhealthy after the partitioning event has occurred.

In some examples, reacting module 108 may, as part of a node, determine up-to-date health statuses for the node's peers based at least in part on whether the cluster-health messages that the node receives from a high-availability cluster indicate that the node's peers are healthy. As indicated above, the fact that a node is currently sending node-health messages to a health-status server and/or the health-status server is receiving node-health messages from the node may indicate that the node is currently healthy. For at least this reason, reacting module 108 may, as part of a node, determine an up-to-date health status for one of the node's peers based at least in part on whether the node is currently receiving cluster-health messages that indicate that the node's peer is currently sending node-health message to a health-status server and/or the health-status server is currently receiving node-health messages from the node's peer. In at least one example, reacting module 108 may, as part of a node, determine that a cluster-health message indicates that the node's peer is not currently sending node-health message to a health-status server and/or that the health-status server is not currently receiving node-health messages from the node's peer by determining that a timestamp associated with the health status of the node's peer indicated by the cluster-health message indicates that the health-status server has not received a node-health message from the node's peer during a predetermined grace period after the partitioning event occurs.

After a partitioning event has occurred and reacting module 108 has determined up-to-date health statuses for a node's peers, reacting module 108 may, as part of the node, cause the node to react to the partitioning event. For example, reacting module 108 may, as part of a standby node, react to a partitioning event by causing the standby node to assume computing tasks assigned to an active node that is unhealthy after the partitioning event has occurred.

In some situations, modules, applications, processes, or threads responsible for enabling a node to react to partitioning events (e.g., a module, application, process, or thread responsible for detecting partitioning events, receiving cluster-health messages after partitioning events, and/or determining how to react to partitioning events) may not be allocated processing time to do so. For example when a partitioning event occurs, a node's central processing unit may be so overloaded (e.g., from performing computing tasks associated with the services provided by the node and its peers) that a module, application, process, or thread responsible for enabling the node to react to the partitioning event may not be allocated processing time to do so in a timely manner. For at least this reason, and as will be described in greater detail below, the systems and methods described herein may prevent a partitioning event from causing a split-brain scenario in a high-availability cluster by ensuring that each node of the high-availability cluster reacts to the partitioning event regardless of whether a module, application, process, or thread responsible for enabling the node to react to the partitioning event is allocated processing time to do so in a timely manner.

In general, the systems and methods described herein may ensure that a node reacts to a partitioning event by reacting as if the node is unhealthy (e.g., by restarting, rebooting, and/or shutting down the node) whenever a module, application, process, or thread responsible for enabling the node to react to the partitioning event has not been allocated processing time to do so for a predetermined amount of time.

FIG. 11 illustrates an exemplary system for ensuring that a node 1100 reacts to partitioning events. As illustrated in this figure, node 1100 may include a user-space thread 1112. In this example, user-space thread 1112 may represent a user-space thread responsible for enabling node 1100 to react to partitioning events. For example, user-space thread 1112 may be responsible for detecting partitioning events (e.g., by monitoring node-health messages 1114), receiving cluster-health messages 1116, and/or determining how to react to partitioning events.

As shown in FIG. 11, node 1100 may also include a kernel-space thread 1122 and a hardware module 1132 that ensure that node 1100 reacts to partitioning events regardless of whether user-space thread 1112 is allocated processing time to do so. In this figure, user-space thread 1112 may periodically transmit update notifications to kernel-space thread 1122 and/or may reset a counter 1134 of hardware module 1132 whenever user-space thread 1112 has been allocated processing time. Likewise, kernel-space thread 1122 may reset counter 1134 of hardware module 1132 whenever kernel-space thread 1122 has been allocated processing time.

Kernel-space thread 1122 and/or hardware module 1132 may be configured to react as if node 1100 is unhealthy (e.g., by restarting, rebooting, and/or shutting down node 1100) whenever user-space thread 1112 and/or kernel-space thread 1122 have not been allocated processing time for a predetermined amount of time. For example, kernel-space thread 1122 may be configured to reset a timer 1124 in response to receiving update notifications from user-space thread 1112 that indicate that user-space thread 1112 was allocated processing time and may be configured to force node 1100 out of a high-availability cluster without a hard restart or reboot whenever timer 1124 expires. Similarly, hardware module 1132 may be configured to periodically decrement counter 1134 and may be configured to restart, reboot, and/or shut down node 1100 when counter 1134 reaches zero.

As explained above, embodiments of the instant disclosure may prevent a partitioning event from resulting in a split-brain scenario within a high-availability cluster by enabling each node of the high-availability cluster to react to the partitioning event based on whether the node receives cluster-health messages from a health-status server associated with the high-availability cluster after the partitioning event occurs and/or based on the health statuses of the other nodes of the high-availability cluster indicated by the cluster-health messages.

For example, embodiments of the instant disclosure may prevent a partitioning event from resulting in a split-brain scenario within a high-availability cluster by causing an active node of the high-availability cluster to continue to perform computing tasks assigned to the active node only if the active node continues to receive cluster-health messages after the partitioning event occurs. In another example, embodiments of the instant disclosure may prevent a partitioning event from resulting in a split-brain scenario within a high-availability cluster by causing a standby node of the high-availability cluster to assume a computing task assigned to a failed active node only if the standby node continues to receive cluster-health messages after the partitioning event occurs and the cluster-health messages indicate that the active node has failed.

Figure 12:
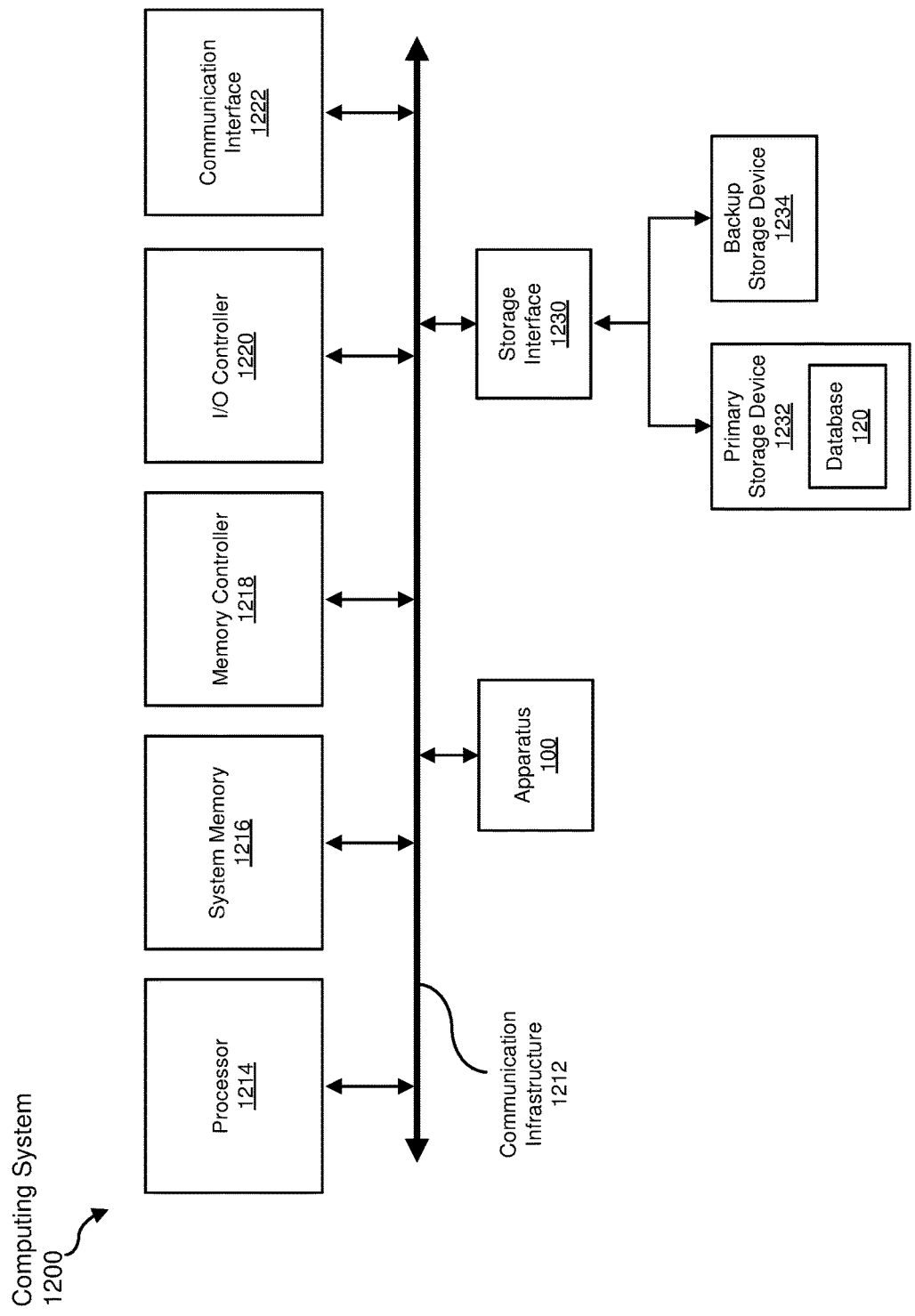
FIG. 12 is a block diagram of an exemplary computing system capable of implementing and/or being used in connection with one or more of the embodiments described and/or illustrated herein.

FIG. 12 is a block diagram of an exemplary computing system 1200 capable of implementing and/or being used in connection with one or more of the embodiments described and/or illustrated herein. In some embodiments, all or a portion of computing system 1200 may perform and/or be a means for performing, either alone or in combination with other elements, one or more of the steps described in connection with FIG. 3. All or a portion of computing system 1200 may also perform and/or be a means for performing and/or implementing any other steps, methods, or processes described and/or illustrated herein. Computing system 1200 broadly represents any type or form of electrical load, including a single or multi-processor computing device or system capable of executing computer-readable instructions. Examples of computing system 1200 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1200 may be programmed, configured, and/or otherwise designed to comply with one or more networking protocols. According to certain embodiments, computing system 1200 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1200 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, a Data Over Cable Service Interface Specification (DOCSIS), and/or any other suitable protocol.

Computing system 1200 may include various network and/or computing components. For example, computing system 1200 may include at least one processor 1214 and a system memory 1216. Processor 1214 generally represents any type or form of processing unit capable of processing data or interpreting and executing instructions. Processor 1214 may represent an application-specific integrated circuit (ASIC), a field-programmable gate array (FPGA), a system on a chip (e.g., a network processor), a hardware accelerator, a general purpose processor, and/or any other suitable processing element.

Processor 1214 may process data according to one or more of the networking protocols discussed above. For example, processor 1214 may execute or implement a portion of a protocol stack, may process packets, may perform memory operations (e.g., queuing packets for later processing), may execute end-user applications, and/or may perform any other computing tasks.

System memory 1216 generally represents any type or form of volatile or non-volatile storage device or medium capable of storing data and/or other computer-readable instructions. Examples of system memory 1216 include, without limitation, Random Access Memory (RAM), Read Only Memory (ROM), flash memory, or any other suitable memory device. Although not required, in certain embodiments computing system 1200 may include both a volatile memory unit (such as, for example, system memory 1216) and a non-volatile storage device (such as, for example, primary storage device 1232, as described in detail below). System memory 1216 may be implemented as shared memory and/or distributed memory in a network device. Furthermore, system memory 1216 may store packets and/or other information used in networking operations. In one example, one or more of modules 102 from FIG. 1 may be loaded into system memory 1216

In certain embodiments, exemplary computing system 1200 may also include one or more components or elements in addition to processor 1214 and system memory 1216. For example, as illustrated in FIG. 12, computing system 1200 may include a memory controller 1218, an Input/Output (I/O) controller 1220, and a communication interface 1222, each of which may be interconnected via communication infrastructure 1212. Communication infrastructure 1212 generally represents any type or form of infrastructure capable of facilitating communication between one or more components of a computing device. Examples of communication infrastructure 1212 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1218 generally represents any type or form of device capable of handling memory or data or controlling communication between one or more components of computing system 1200. For example, in certain embodiments memory controller 1218 may control communication between processor 1214, system memory 1216, and I/O controller 1220 via communication infrastructure 1212. In some embodiments, memory controller 1218 may include a Direct Memory Access (DMA) unit that may transfer data (e.g., packets) to or from a link adapter.

I/O controller 1220 generally represents any type or form of device or module capable of coordinating and/or controlling the input and output functions of a computing device. For example, in certain embodiments I/O controller 1220 may control or facilitate transfer of data between one or more elements of computing system 1200, such as processor 1214, system memory 1216, communication interface 1222, and storage interface 1230.

Communication interface 1222 broadly represents any type or form of communication device or adapter capable of facilitating communication between exemplary computing system 1200 and one or more additional devices. For example, in certain embodiments communication interface 1222 may facilitate communication between computing system 1200 and a private or public network including additional computing systems. Examples of communication interface 1222 include, without limitation, a link adapter, a wired network interface (such as a network interface card), a wireless network interface (such as a wireless network interface card), and any other suitable interface. In at least one embodiment, communication interface 1222 may provide a direct connection to a remote server via a direct link to a network, such as the Internet. Communication interface 1222 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1222 may also represent a host adapter configured to facilitate communication between computing system 1200 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1222 may also enable computing system 1200 to engage in distributed or remote computing. For example, communication interface 1222 may receive instructions from a remote device or send instructions to a remote device for execution.

As illustrated in FIG. 12, exemplary computing system 1200 may also include a primary storage device 1232 and/or a backup storage device 1234 coupled to communication infrastructure 1212 via a storage interface 1230. Storage devices 1232 and 1234 generally represent any type or form of storage device or medium capable of storing data and/or other computer-readable instructions. For example, storage devices 1232 and 1234 may represent a magnetic disk drive (e.g., a so-called hard drive), a solid state drive, a floppy disk drive, a magnetic tape drive, an optical disk drive, a flash drive, or the like. Storage interface 1230 generally represents any type or form of interface or device for transferring data between storage devices 1232 and 1234 and other components of computing system 1200. In one example, database 120 from FIG. 1 may be stored in primary storage device 1232.

In certain embodiments, storage devices 1232 and 1234 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1234 may also include other similar structures or devices for allowing computer software, data, or other computer-readable instructions to be loaded into computing system 1200. For example, storage devices 1232 and 1234 may be configured to read and write software, data, or other computer-readable information. Storage devices 1232 and 1234 may be a part of computing system 1200 or may be separate devices accessed through other interface systems.

Many other devices or subsystems may be connected to computing system 1200. Conversely, all of the components and devices illustrated in FIG. 12 need not be present to practice the embodiments described and/or illustrated herein. The devices and subsystems referenced above may also be interconnected in different ways from those shown in FIG. 12. Computing system 1200 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of power-redundant system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   detecting, at a standby node of a high-availability cluster, a partitioning event that isolates the standby node from an active node of the high-availability cluster;
   after the partitioning event has occurred:
      broadcasting, from a health-status server, a cluster-health message to at least the standby node, wherein:
         the health-status server is separate and distinct from the standby node and the active node;
         the cluster-health message comprises at least a health status of the active node;
         the health status of the active node is based at least in part on whether the health-status server received a node-health message from the active node after the partitioning event occurred;
      reacting, at the standby node, to the partitioning event such that the partitioning event does not result in a split-brain scenario within the high-availability cluster by performing, based at least in part on whether the standby node received the cluster-health message from the health-status server, at least one of:
         leaving the high-availability cluster;
         assuming at least one computing task assigned to the active node.

2. The computer-implemented method of claim 1, wherein reacting to the partitioning event comprises:
   determining, at the standby node, that the standby node did not receive the cluster-health message from the health-status server;
   leaving, at the standby node and in response to not receiving the cluster-health message from the health-status server, the high-availability cluster.

3. The computer-implemented method of claim 1, wherein reacting to the partitioning event is further based at least in part on the health status of the active node indicated by the cluster-health message.

4. The computer-implemented method of claim 3, wherein reacting to the partitioning event comprises:
   determining, at the standby node, that the health status of the active node indicated by the cluster-health message indicates that the active node is not healthy;
   assuming, at the standby node and in response to the active node being not healthy, the at least one computing task assigned to the active node.

5. The computer-implemented method of claim 4, wherein determining that the health status of the active node indicated by the cluster-health message indicates that the active node is not healthy comprises determining that the health status of the active node indicated by the cluster-health message indicates that the health-status server did not receive a node-health message from the active node during a predetermined grace period after the partitioning event occurs.

6. The computer-implemented method of claim 1, wherein broadcasting the cluster-health message to the standby node comprises:
   receiving, at the health-status server, the node-health message from the active node, wherein the node-health message from the active node comprises health-status information about the active node;
   creating, at the health-status server, the cluster-health message such that it includes at least the health-status information about the active node;
   sending, from the health-status server, the cluster-health message to the standby node.

7. The computer-implemented method of claim 1, further comprising ensuring that the standby node reacts to the partitioning event by:
   receiving, via a user-space thread running on the standby node, any cluster-health message from the health-status server;
   updating, via the user-space thread and in response to receiving any cluster-health message from the health-status server, a hardware module of the standby node that reboots the standby node after a predetermined time period has passed since the hardware module is last updated;
   rebooting, via the hardware module and in response to the predetermined time period having passed since the hardware module was last updated, the standby node.

8. The computer-implemented method of claim 1, further comprising ensuring that the standby node reacts to the partitioning event by:
   receiving, via a user-space thread running on the standby node, any cluster-health message from the health-status server;
   updating, via the user-space thread and in response to receiving any cluster-health message from the health-status server, a kernel-space thread running on the standby node that reboots the standby node after a predetermined time period has passed since the kernel-space thread is last updated;
   rebooting, via the kernel-space thread and in response to the predetermined time period having passed since the kernel-space thread was last updated, the standby node.

9. The computer-implemented method of claim 1, further comprising ensuring that the standby node reacts to the partitioning event by:
   receiving, via a user-space thread running on the standby node, any cluster-health message from the health-status server;
   updating, via the user-space thread and in response to receiving any cluster-health message from the health-status server, a kernel-space thread running on the standby node, wherein:
      the kernel-space thread updates a hardware module of the standby node in response to being updated by the user-space thread;
      the hardware module reboots the standby node after a predetermined time period has passed since the hardware module is last updated;
   updating, via the kernel-space thread and in response to being updated by the user-space thread, the hardware module;
   rebooting, via the hardware module and in response to the predetermined time period having passed since the hardware module was last updated, the standby node.

10. The computer-implemented method of claim 1, further comprising periodically sending, from each node of the high-availability cluster to the health-status server, an additional node-health message that indicates the health status of the node.

11. The computer-implemented method of claim 1, further comprising periodically broadcasting, from the health-status server, an additional cluster-health message to each node of the high-availability cluster, wherein the cluster-health message:
   is based on node-health messages received at the health-status server from nodes of the high-availability cluster;
   indicates a health status for each node of the high-availability cluster.

12. A system comprising:
   a detecting module that detects, at a standby node of a high-availability cluster, a partitioning event that isolates the standby node from an active node of the high-availability cluster;
   a broadcasting module that broadcasts, from a health-status server and after the partitioning event has occurred, a cluster-health message to at least the standby node, wherein:
      the health-status server is separate and distinct from the standby node and the active node;
      the cluster-health message comprises at least a health status of the active node;
      the health status of the active node is based at least in part on whether the health-status server received a node-health message from the active node after the partitioning event occurred;
   a reacting module that reacts, at the standby node and after the partitioning event has occurred, to the partitioning event such that the partitioning event does not result in a split-brain scenario within the high-availability cluster by performing, based at least in part on whether the standby node received the cluster-health message from the health-status server, at least one of:
      causing the standby node to leave the high-availability cluster;
      causing the standby node to assume at least one computing task assigned to the active node;
   at least one physical processor that executes the detecting module, the broadcasting module, and the reacting module.

13. The system of claim 12, wherein the reacting module reacts to the partitioning event by:

determining, at the standby node, that the standby node did not receive the cluster-health message from the health-status server;

causing, in response to not receiving the cluster-health message from the health-status server, the standby node to leave the high-availability cluster.

14. The system of claim 12, wherein the reacting module reacts to the partitioning event based at least in part on the health status of the active node indicated by the cluster-health message.

15. The system of claim 14, wherein the reacting module reacts to the partitioning event by:

determining, at the standby node, that the health status of the active node indicated by the cluster-health message indicates that the active node is not healthy;

causing, in response to the active node being not healthy, the standby node to assume the at least one computing task assigned to the active node.

16. The system of claim 15, wherein the reacting module determines that the health status of the active node indicated by the cluster-health message indicates that the active node is not healthy by determining that the health status of the active node indicated by the cluster-health message indicates that the health-status server did not receive a node-health message from the active node during a predetermined grace period after the partitioning event occurs.

17. The system of claim 12, wherein the broadcasting module broadcasts the cluster-health message to the standby node by:

receiving, at the health-status server, the node-health message from the active node, wherein the node-health message from the active node comprises health-status information about the active node;

creating, at the health-status server, the cluster-health message such that it includes at least the health-status information about the active node;

sending, from the health-status server, the cluster-health message to the standby node.

18. The system of claim 12, wherein the reacting module further ensures that the standby node reacts to the partitioning event by:

receiving, via a user-space thread running on the standby node, any cluster-health message from the health-status server;

updating, via the user-space thread and in response to receiving any cluster-health message from the health-status server, a hardware module of the standby node that reboots the standby node after a predetermined time period has passed since the hardware module is last updated;

rebooting, via the hardware module and in response to the predetermined time period having passed since the hardware module was last updated, the standby node.

19. The system of claim 12, wherein the reacting module further ensures that the standby node reacts to the partitioning event by:

receiving, via a user-space thread running on the standby node, any cluster-health message from the health-status server;

updating, via the user-space thread and in response to receiving any cluster-health message from the health-status server, a kernel-space thread running on the standby node that reboots the standby node after a predetermined time period has passed since the kernel-space thread is last updated;

rebooting, via the kernel-space thread and in response to the predetermined time period having passed since the kernel-space thread was last updated, the standby node.

20. A non-transitory computer-readable-storage medium comprising one or more computer-readable instructions that, when executed by at least one processor of at least one computing device, cause the computing device to:

detect, at a standby node of a high-availability cluster, a partitioning event that isolates the standby node from an active node of the high-availability cluster;

after the partitioning event has occurred:

broadcast, from a health-status server, a cluster-health message to at least the standby node, wherein:

the health-status server is separate and distinct from the standby node and the active node;

the cluster-health message comprises at least a health status of the active node;

the health status of the active node is based at least in part on whether the health-status server received a node-health message from the active node after the partitioning event occurred;

react, at the standby node, to the partitioning event such that the partitioning event does not result in a split-brain scenario within the high-availability cluster by performing, based at least in part on whether the standby node received the cluster-health message from the health-status server, at least one of:

causing the standby node to leave the high-availability cluster;

causing the standby node to assume at least one computing task assigned to the active node.

* * * * *